Patented July 3, 1928.

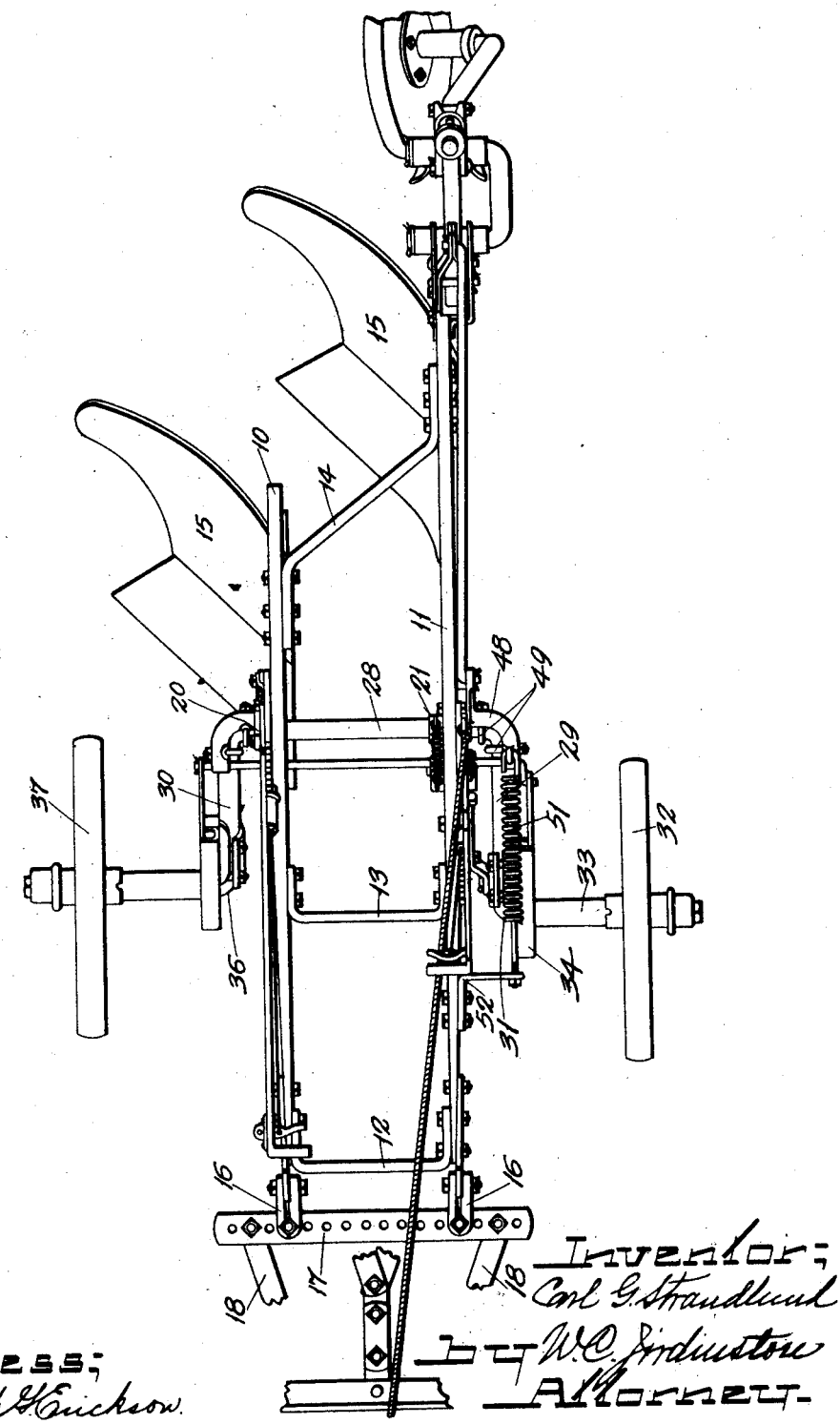

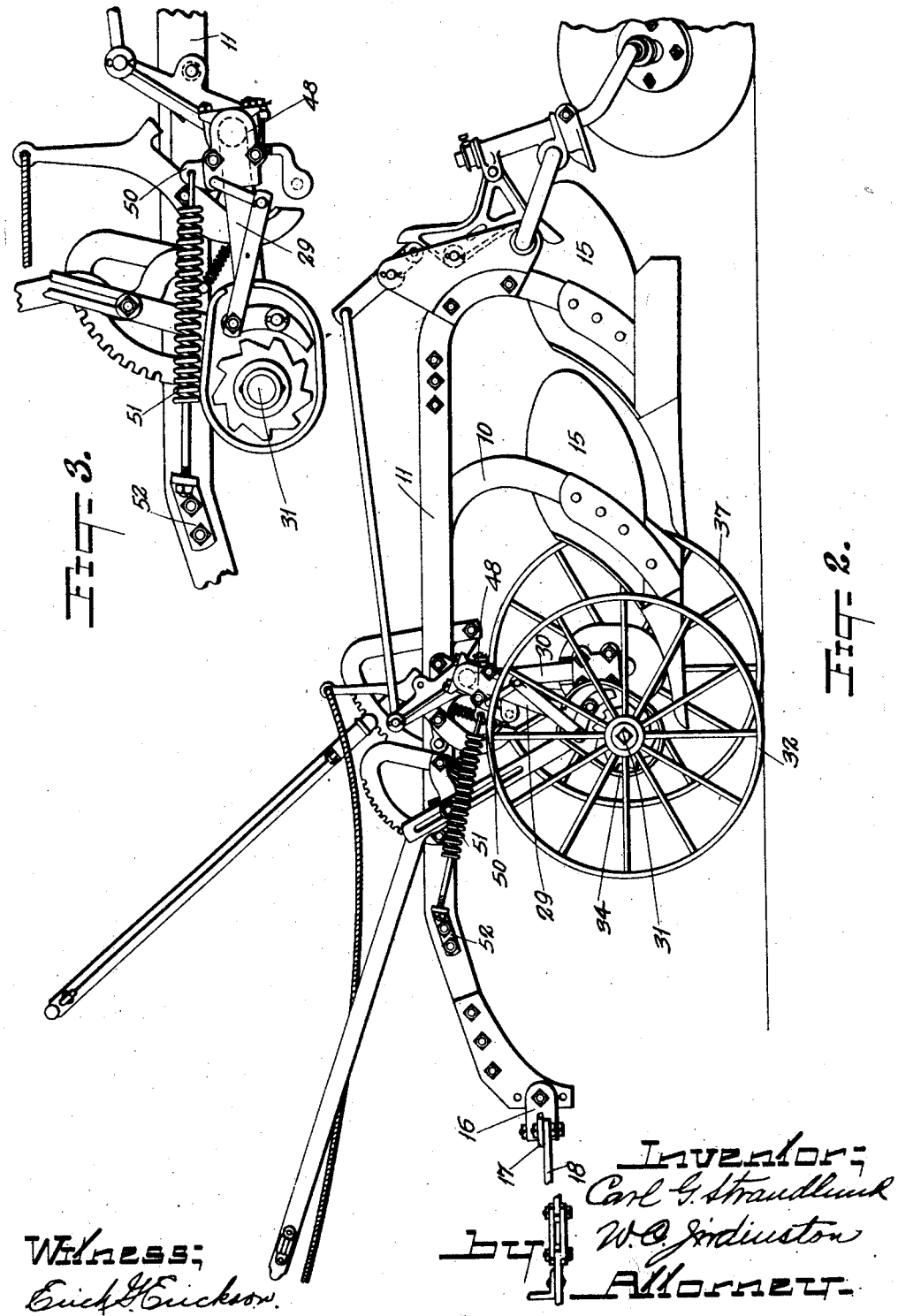

1,675,433

UNITED STATES PATENT OFFICE.

CARL G. STRANDLUND, OF MOLINE, ILLINOIS, ASSIGNOR TO DEERE & COMPANY, OF MOLINE, ILLINOIS, A CORPORATION OF ILLINOIS.

POWER LIFT PLOW.

Application filed October 1, 1923, Serial No. 665,897. Renewed April 17, 1926.

My invention relates to wheeled plows and more particularly to that type in which traction power is utilized to lift the plow out of operation, and the object of my invention is to provide means operative to add to the power employed in raising the plow and to exert an assisting force in the initial lowering movement of the plow.

Referring to the drawings in which similar numerals indicate identical parts—

Figure 1 is a plan view of a wheeled plow embodying my improvement. Figure 2 is a side elevation of Figure 1 with the plow raised, and Figure 3 is an enlarged fragmentary view illustrating the operative position of my improvement when the plow is down.

The type of plow shown is more clearly illustrated and described in a pending joint application, Serial No. 393,823, filed by Theophilus Brown and myself, to which reference is made for a more complete description, and for which purpose I employ similar numerals indicating the parts in this application believed necessary to show my improvement and its operation. The plow, in this instance, includes beams 10 and 11 spaced and secured rigidly together by braces 12, 13, and 14. Plow bodies 15 are mounted on the beams 10 and 11, and on the forward ends of the latter are clevises 16 by which the beams are connected to a transverse bar 17 adapted to be attached to a tractor by suitable links 18. The beams 10 and 11 which, with the braces 12, 13 and 14, constitute the frame of the plow, are supported on a transverse axle 28 the horizontal portion of which is supported in bearings 20 and 21 secured respectively on the beams 10 and 11 so that it may rock about a transverse axis. The axle 28 is bent to present depending portions or arms 29 and 30, which terminate in horizontal spindles 31 and 36 upon which are journaled respectively a land wheel 32 and a furrow wheel 37.

The mechanism for lifting the plow is actuated by the traction power of the land wheel conveyed through a clutch adapted to be tripped into activity by the operator to raise the plow, and released to lower the plow, both operations being fully described in the application above cited. I do not, however, limit myself to the particular mechanism therein described as my improvement can be readily applied to plows having a different type of raising and lowering mechanism with equal efficiency in operation.

Secured on the axle 28, at the bend between its horizontal portion and the arm 29, by clamps 49, is a casting 48 having integral therewith an eye 50 which projects forwardly from the casting and in which is hooked an end of a coiled spring 51. The opposite end of the spring 51 extends through a hole in a bracket 52, mounted forwardly on the beam 11, and is secured in place by a nut, the end of the spring being threaded for that purpose and also for the purpose of varying the tension of the spring 51.

As stated, the plow is raised by the traction power of the land wheel which, at the will of the operator, is utilized to swing the horizontal portion of the axle 28 upon the arms 29, 30 upward and forward about the wheel axes whereby the frame is raised and the plow bodies elevated above the ground; this operation is assisted by the spring 51 which is at its greatest tension when the plow is down and the parts are in the position shown in Figure 3, for as the spring 51 is connected to the eye 50 which, when the plow is down, is above the axis of the axle 28, it is evident considerable force is added to the traction power of the land wheel to raise the plow. As the plow rises the eye 50 swings forward, or toward the front end connection of the spring 51, which consequently contracts, until when said eye is carried into alinement with a line intersecting the point of connection of the spring to the beam 11 and the horizontal axis of the axle 28, the lifting tendency of the spring ceases. From this point on the traction power of the land wheel 32 is sufficient to complete the operation.

As the lifting movement of the axle 28 continues the eye 50 moves downward and away from the front end connection of the spring 51, so that said spring is again extended until the plow has been raised to its limit above the ground, and the mechanism operates to hold the plow in this position. The force of the spring 51 is now pulling to swing the horizontal portion of the axle 28 upon the arms 29, 30 downward and rearward about the wheel axes, thereby lowering the frame, which spring action I have found is very desirable when the mechanism is tripped to lower the plow by gravity, for it is evident that, as the plow is fixed to the tractor, when the axle 28 has been rocked in lifting the plow until the arm 29 is at a forward angle to a vertical line through the axis of the horizontal part of the axle, and the arm 30 is at a slightly rearward angle to said line, the weight of the plow tends to prevent a rapid lowering movement of the axle when the plow has been released to drop to the ground; and I overcome this tendency by means of the spring 51, which when the plow is fully raised exerts its tension to swing the axle in a direction to lower the plow.

What I claim is—

1. In a wheeled plow, the combination of a beam structure, a wheeled support movable to lift or lower the plow, mechanism actuated by power of the traction to move said support to lift the plow, and means connected with the beam structure and with said support, and cooperating with said mechanism to increase the power thereof as the plow rises and operating to resist said power as the plow approaches its pre-determined height.

2. In a wheeled plow, the combination of a beam structure, a wheeled support movable to lift or lower the plow, mechanism actuated by power of the traction to move said support to lift the plow, and a coiled spring connected with the beam structure and with said support, and cooperating with said mechanism to increase the power thereof as the plow rises and operating to resist said power as the plow approaches its pre-determined height.

3. In a wheeled plow having a rockable crank axle and supporting wheels, the combination with mechanism actuated by power of the traction to rock said axle and raise the plow, of means connected to the plow and the axle and cooperating with said mechanism to increase the power thereof for a limited time as the axle is rocked and the plow rises, said means resisting said power as the plow approaches its pre-determined height.

4. In a wheeled plow having a frame, a rockable crank axle and supporting wheels, the combination with mechanism actuated by power of the traction to rock said axle and raise the plow, of a coiled spring connected to the frame and the axle and cooperating with said mechanism to increase the power thereof for a limited time as the axle is rocked and the plow rises, said spring resisting said power as the plow approaches its pre-determined height.

5. In a wheeled plow having a frame, a rockable crank axle and supporting wheels, the combination with mechanism to rock said axle and raise the plow, of a coiled spring connected to the frame and to a projection fixed on the axle and movable therewith, said spring cooperating with said mechanism to rock said axle to raise the plow, the tension of said spring being affected only by the raising and lowering of the plow, and being greatest when the plow is in operation, diminishing as the plow rises from its operative position and increasing as the plow in rising approaches a predetermined height.

6. In a power lift plow, the combination of a beam structure, a wheeled support movable to lift or lower the plow, mechanism operable to move said support to raise the plow, and means connected with the beam structure and with said support, and cooperating with said mechanism to increase the power thereof as the plow rises and resisting said power as the plow approaches its pre-determined height.

7. In a wheeled plow, the combination with a beam structure, a wheeled support movable to lift or lower the plow, mechanism for moving said support to lift the plow from operative to transport position, of means connected with the beam structure and with said support and controlled by upward movement of the plow, to initially supplement the lifting power and then to resist such lifting power.

8. In a wheeled plow, the combination with a beam structure, a wheeled support movable to lift or lower the plow, power actuated mechanism for moving said support to lift the plow from operative to transport position, of means connected with the beam structure and with said support and operating initially in the lifting operation to supplement the lifting power, and, when the plow is in its transport position, acting to apply lowering power to the plow.

9. In a wheeled plow, the combination with a beam structure, a wheeled support movable to lift or lower the plow, power actuated mechanism for moving said support to lift the plow from operative to transport position, of a spring connected with the beam structure and with said support, and initially cooperating with said mechanism to lift the plow, and operating to apply lowering power to said mechanism when the plow is in its transport position.

10. In a wheeled plow, the combination with a plow body carrying frame, an axle supporting said frame and having a swinging arm provided with a wheel spindle, and a ground wheel mounted on said spindle, whereby the plow may be raised or lowered by swinging said arm, of mechanism for applying tractive power to swing said arm to lift the plow, and means connected with the frame and with said axle and initially coacting with the tractive power to swing the axle to lift the plow, and tending when the plow reaches a predetermined height, to swing the axle in the opposite direction, to lower the plow.

11. In a wheeled plow, the combination with a plow body carrying frame, an axle supporting said frame and having a swinging arm provided with a wheel spindle, and a ground wheel mounted on said spindle, whereby the plow may be raised or lowered by swinging said arm, of mechanism for applying tractive power to swing said arm to lift the plow, and a spring connected with the frame and with said axle and movable by the swinging of said axle from a position to apply lifting force thereto to a position to apply lowering force thereto.

12. In a wheeled plow, the combination with a plow body carrying frame, an axle supporting said frame and having a swinging arm provided with a wheel spindle, and a ground wheel mounted on said spindle, whereby the plow may be raised or lowered by swinging said arm, of mechanism for applying power to swing said arm to lift the plow, and a spring connected at one end with the frame and at the other end with said axle, and tending to lift the plow when it is in operative position, the latter end of the spring being movable by the swinging of the axle in lifting the plow, from one side to the other of a line intersecting the axis of the axle and the connection of said spring with the frame.

CARL G. STRANDLUND.